(No Model.)   3 Sheets—Sheet 1.

H. R. SILLMAN.
BRONZING MACHINE.

No. 265,286. Patented Oct. 3, 1882.

ATTEST:
J. A. Hurdle
Chas. S. Hills

INVENTOR:
Henry R. Sillman
Pr. J. A. Hurdle
att (No Model.)  H. R. SILLMAN.  3 Sheets—Sheet 2.
BRONZING MACHINE.

No. 265,286.  Patented Oct. 3, 1882.

ATTEST:  INVENTOR:

(No Model.)

H. R. SILLMAN.

BRONZING MACHINE.

No. 265,286.   Patented Oct. 3, 1882.

ATTEST:

INVENTOR:

UNITED STATES PATENT OFFICE.

HENRY R. SILLMAN, OF BROOKLYN, NEW YORK.

BRONZING-MACHINE.

SPECIFICATION forming part of Letters Patent No. 265,286, dated October 3, 1882.

Application filed July 10, 1882. (No model.)

*To all whom it may concern:*

Be it known that I, HENRY R. SILLMAN, a citizen of the United States, residing at Brooklyn, in the county of Kings and State of New York, have invented certain new and useful Improvements in Bronzing-Machines; and I do hereby declare that the following is a full, clear, and exact description of the invention, which will enable others skilled in the art to which it appertains to make and use the same.

I am aware that bronzing-machines have heretofore been made of various forms provided with drawers at the lower part of their structure, into which the surplus bronze would naturally precipitate until they were partly filled, after which they were drawn out and emptied into the hopper. This constant change of the drawers caused a great waste of material, which the manufacturers could not prevent with a machine of this construction. These objections are obviated by my invention, which consists of an endless apron or scraper mounted on a pair of rollers placed at each end a convenient distance above the bottom of the interior of the frame of the machine, the said apron to be provided with brushes or projecting strips extending across its face at a suitable distance apart. The forward roller of the said apron will be provided with a bevel-gear, which is driven by other gears connected with the main shaft.

My invention also consists of a spiral conveyer placed within the frame at the forward end. The shaft of the said spiral is driven by a pulley mounted on the shaft of the forward roller, carrying the endless apron or scraper.

My invention also consists of a vertical elevator or conveyer, made in a spiral form, placed at one side of the endless apron or scraper, the said elevator or conveyer to be operated by a vertical shaft connected with the main shaft by gears.

Figure 1:
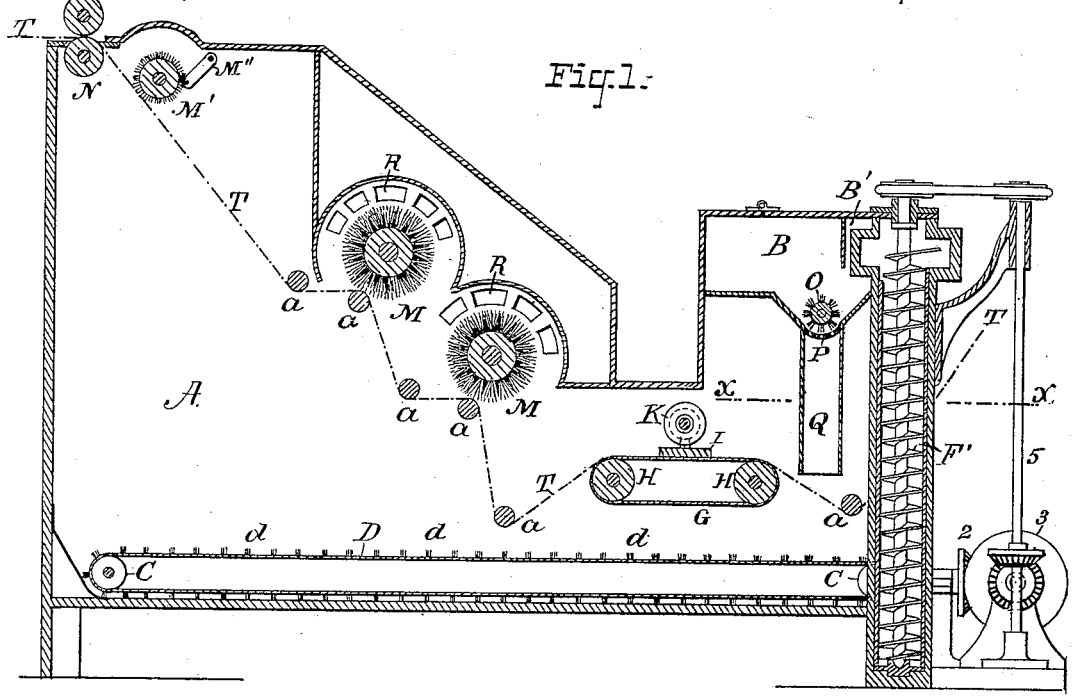
Figure 2:
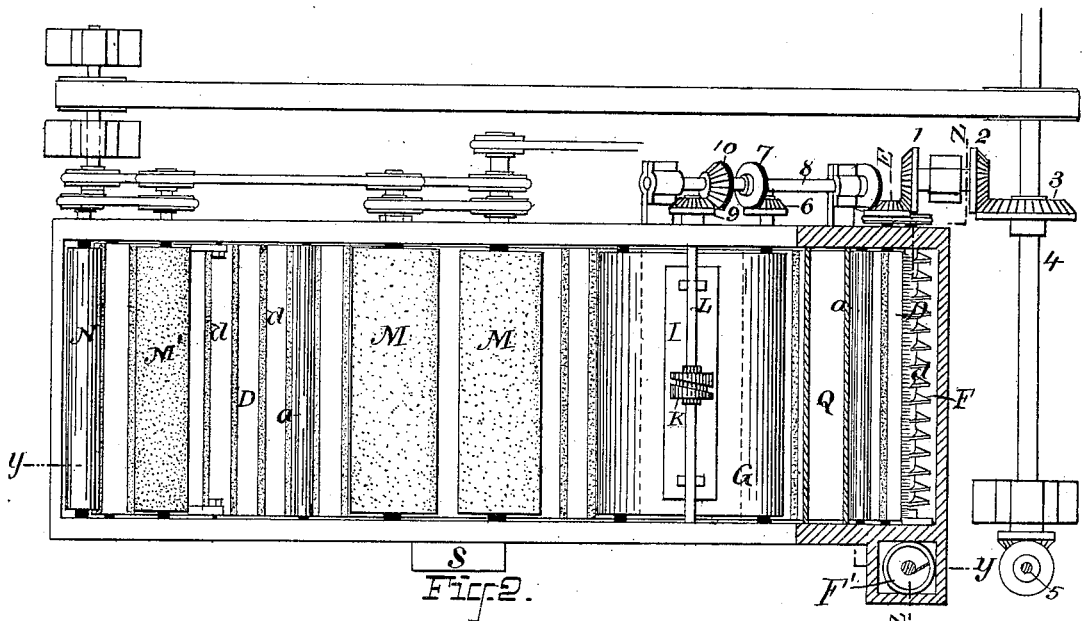
Figure 3:
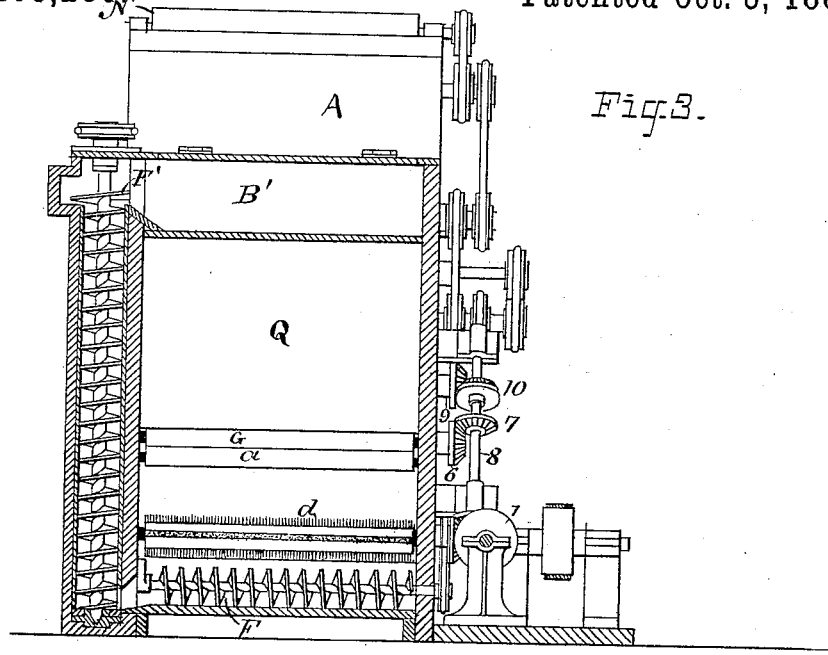
Figure 4:
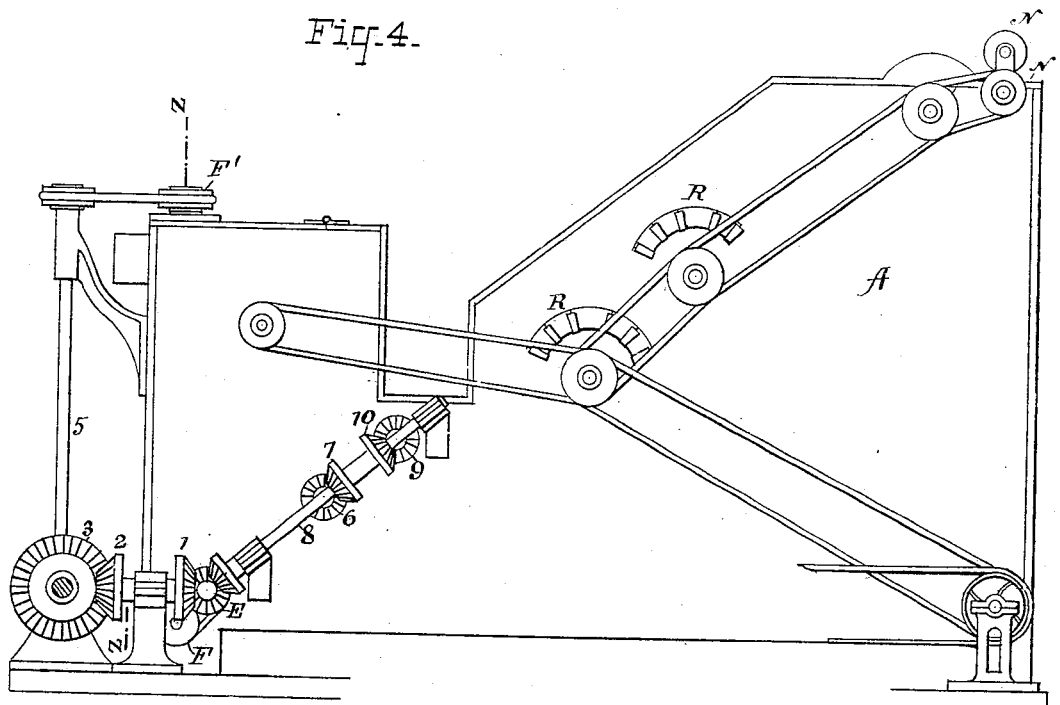
Figure 5:
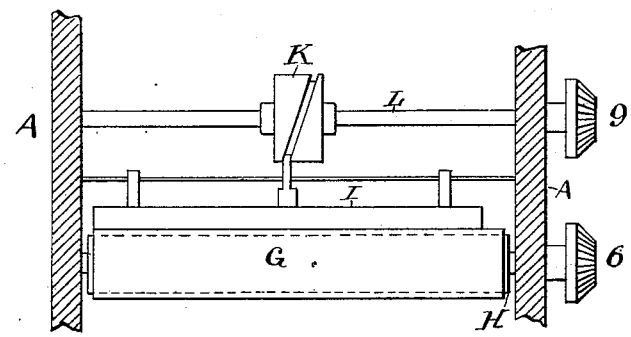
Figure 6:
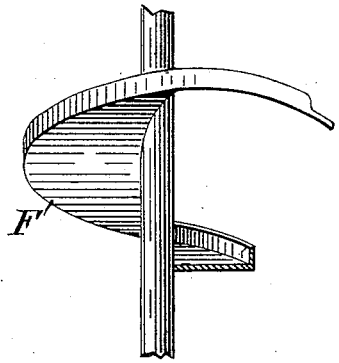

In the drawings, Figure 1 represents a vertical section taken on line $y\ y$. Fig. 2 represents a part plan and sectional view taken on the line $x\ x$. Fig. 3 represents a vertical section taken on line $z\ z$. Fig. 4 represents a side elevation, showing the gears and pulleys for driving the different shafts. Fig. 5 represents a part of the frame, in section, showing the grooved cam, polishing-block, and endless apron. Fig. 6 represents a detail view of the upper end of the spiral elevator.

In the drawings, A is the frame, provided with hoppers B B', located at the forward end.

C C represent a pair of rollers having their bearings in the sides of the frame A. The said rollers C C carry an endless apron, D, provided with brushes or projecting strips $d\ d\ d$, placed at a suitable distance apart. The said brushes or strips are so arranged as to scrape the interior bottom of the frame. The shaft of the foremost roller C is provided with a bevel-gear, E, which is driven by gears 1 and 2, connected with the gear 3 of the main shaft 4.

F represents a spiral conveyer having its bearings in the sides of the frame. The said spiral is driven by the shaft of the forward roller C, carrying the endless apron or scraper D.

F' represents a spiral elevator or conveyer, the blade of which is provided with a projecting rim on its upper surface, said spiral being driven by the shaft 5, connected with main shaft 4.

G represents an endless apron, mounted on a pair of rollers, H H, the foremost one of which is provided with a bevel-gear, 6, which is operated by a gear, 7, mounted on the inclined shaft 8, which works in connection with the gear E.

I represents a digger or polishing-block, which is operated by the grooved cam K, mounted on the shaft L, which is provided with a bevel-gear, 9, which works in connection with the gear 10 of the shaft 8.

M M M' represent brushes or dusters of a cylindrical form, mounted on shafts having their bearings in the body of the frame A. The said shafts are provided with pulleys on the exterior of the frame A, and are provided with belts for rotating the same. The brush M' is provided with a cleaver, M''.

N N represent a pair of feeding-rollers, one of which is provided with a pulley for rotating the same.

O represents a feeding-brush, arranged in the trough P, the bottom of which is perforated to allow the bronze-powder to precipitate down and through the chute Q.

R R are adjustable slides, placed over apertures of the frame A.

S is the blower-pipe in the side of the frame A.

$a\ a\ a\ a\ a\ a$ are loose rollers for conveying the paper T to be bronzed.

Mode of operation: The paper to be bronzed is first passed through the machine on the loose rollers *a a a a a a* until the foremost end reaches the feeding-rollers N N. The bronze is then placed in the hopper B, after which the machine is started, at which time the feeding-brush O forces the bronze-powder through the perforations in the bottom of the trough P, which causes the bronze to precipitate down through the chute Q to the upper surface of the paper T, which is drawn through the machine by the feeding-rollers N N, and is carried on the upper surface of the endless apron G, and there polished by the digger or polishing-block I, which is rapidly moved on the surface of the paper by means of the grooved cam K. The paper moves forward, carrying with it a surplus of bronze, which is brushed off by the dusters or brushes M M M', which causes the bronze to fall to the bottom of the interior of the frame, and is brushed or scraped to the forward end to a spiral conveyer, F, by the endless apron or scraper D. One end of the trough containing the spiral F is provided with an opening communicating with the spiral elevator F', which conveys the surplus bronze to the hopper B', from which it is brushed into the trough P, from which it falls to the paper beneath it.

While the machine is in motion a great deal of bronze-powder is floating above the paper, and in order to get rid of this the slides R R, covering apertures in the side of the frame A, are moved to any suitable height, which allows the air to enter, carrying off the floating bronze-powder by means of the blower-pipe S.

Having thus described my invention, what I claim as new, and desire to secure by Letters Patent, is—

1. Broadly, an automatic bronzing-machine feeding itself by endless aprons or spiral conveyers placed within the frame of the machine.

2. In a bronzing-machine, a conveying device for carrying the waste or surplus bronze-powder from the bottom or sides of a bronzing-machine to a suitable mechanism to elevate it to a self-feeding hopper.

3. In a bronzing-machine, the endless apron or scraper D, or its equivalent, in combination with a revolving or stationary brush or duster, substantially as shown and described.

4. In a bronzing-machine, the spiral conveyer F, in combination with the spiral elevator or conveyer F', substantially as shown and described.

5. In a bronzing-machine, the conveyer or elevator F', in combination with a revolving self-feeding brush, O, substantially as shown and described.

6. In a bronzing-machine, the endless apron D, provided with scrapers, in combination with the spiral conveyer F and the spiral elevator F', substantially as shown and described.

7. In a bronzing-machine, the adjustable air-conveyers, with sliding doors R R, in combination with brushes or dusters M M, substantially as shown and described.

In testimony that I claim the foregoing I have hereunto set my hand.

HENRY R. SILLMAN.

Witnesses:
CHAS. S. HILLS,
JOHN MOON.